March 19, 1957 G. M. HAMBLETON 2,785,584
ENGINE CONTROL DEVICE
Filed Jan. 28, 1955 2 Sheets-Sheet 1
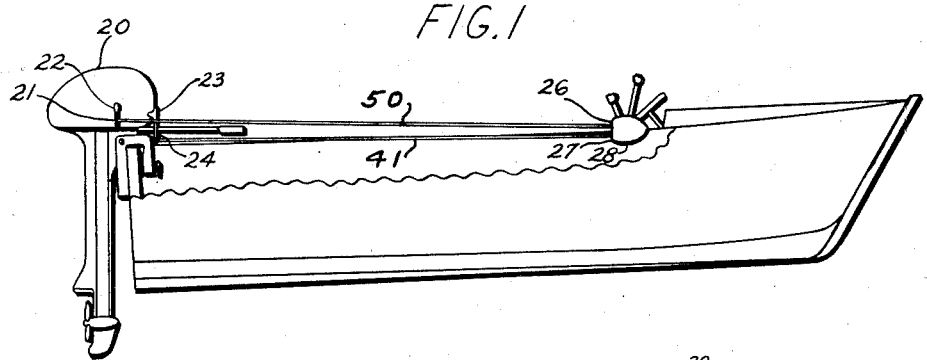
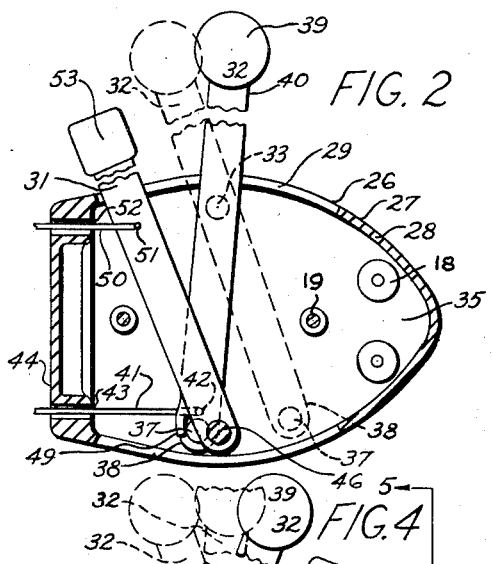
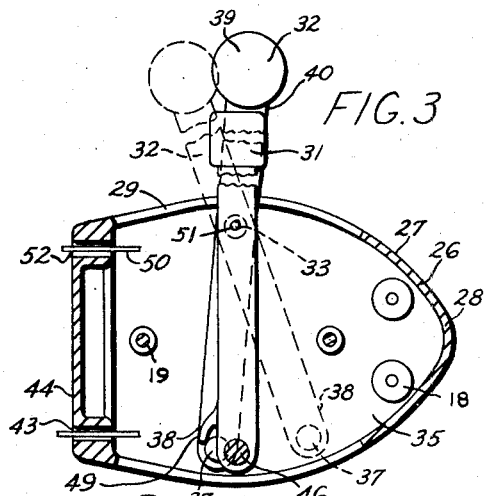
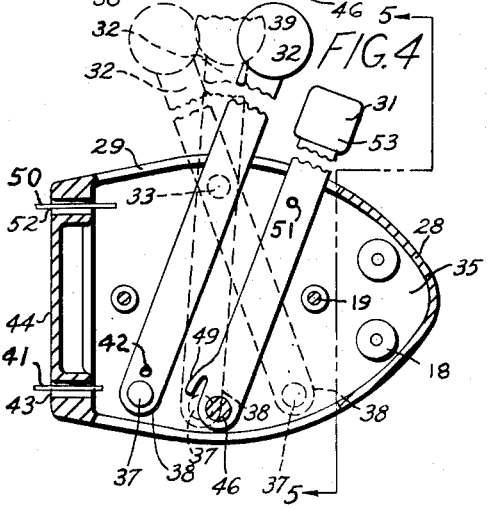
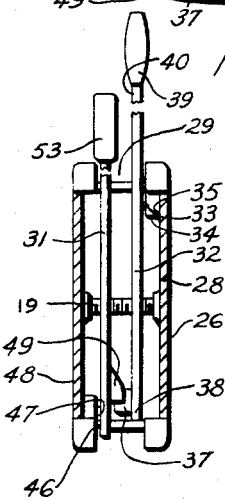
INVENTOR.
GEORGE M. HAMBLETON
BY
Pearson + Pearson
ATTORNEYS March 19, 1957 G. M. HAMBLETON 2,785,584
ENGINE CONTROL DEVICE
Filed Jan. 28, 1955 2 Sheets-Sheet 2
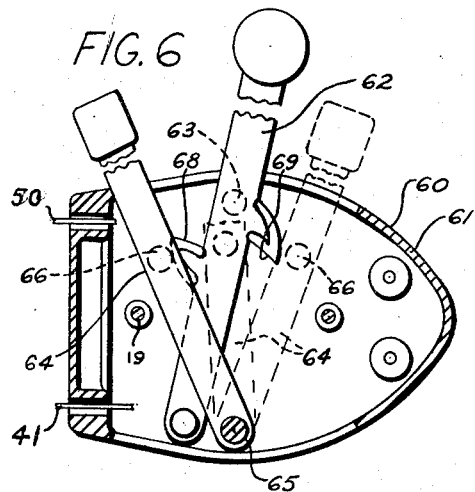
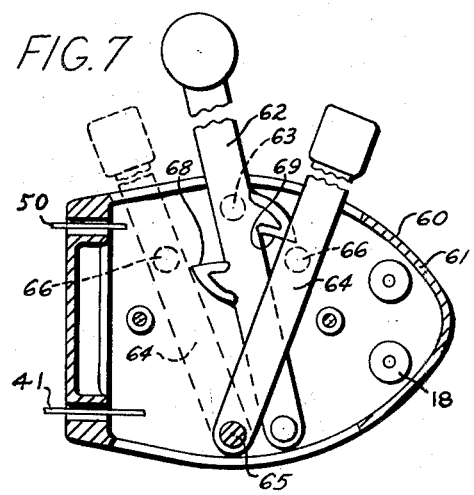
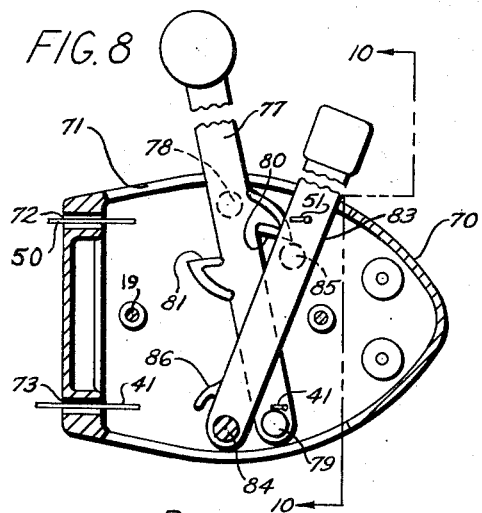
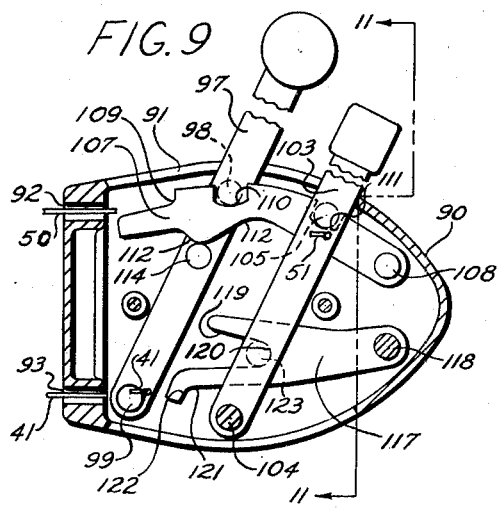
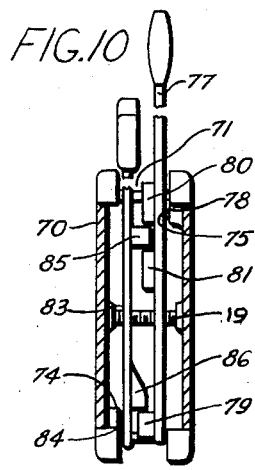
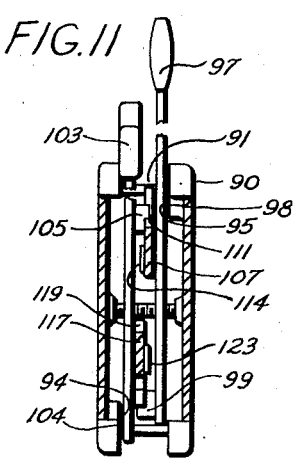
INVENTOR.
GEORGE M. HAMBLETON
BY
Pearson + Pearson
ATTORNEYS

United States Patent Office 2,785,584
Patented Mar. 19, 1957

2,785,584
ENGINE CONTROL DEVICE

George M. Hambleton, Nashua, N. H., assignor to New England Bobbin & Shuttle Co., Nashua, N. H., a partnership Application January 28, 1955, Serial No. 484,689

8 Claims. (Cl. 74—472)

This invention relates to control devices for internal combustion engines having power shift and speed change mechanisms and especially to such engines of the outboard motor type.

It has heretofore been proposed to build into an internal combustion power unit various automatic controls for preventing the shifting of gears at high speed or preventing high speed when the power unit is shifted to neutral or reverse. However there are many gear shift power units, such as outboard motors, now in use in which no such automatic control is provided. In addition, the automatic controls built in to certain power units tend to be complicated, costly to manufacture and to occupy considerable space.

It is an object of this invention to provide a simplified, positive, automatic control device equally adaptable for incorporation in a power unit when manufactured, or for association in a seprate housing with existing gear shift motors and capable of limiting power change and speed change to certain desirable ranges and positions.

Another object of the invention is to provide a shift and throttle control for outboard motors wherein all of the movable parts may be thin elongated members movable in closely spaced parallel planes whereby the control occupies only a flat thin space and does not require a bulky housing.

A further object of the invention is to provide a remote control device for shiftable outboard motors wherein power shift can take place only in low speed range and high speed range can be used only in forward shift position.

Still another object of the invention is to provide locking means for interconnecting a gear shift lever and a speed change lever wherein the locking means is fixed to or integral with the respective levers and cannot become maladjusted.

A still further object of the invention is to provide a pair of parallel, oscillatable engine control members both having a lug and cam element adapted to interengage with the other whereby the oscillatory movement of each lever is controlled by the angular position of the other.

Other objects of the invention will be apparent from the drawings and the following description thereof wherein preferred embodiments of the control device are illustrated.

In the drawings:

Fig. 1 is a side elevation in section showing a typical outboard motor boat with the control device of this invention installed in the forward portion of the boat.

Fig. 2 is an enlarged side elevation in section on line 2—2 of Fig. 5 showing one angular position of two control members, wherein the gear shift member controls the throttle member.

Fig. 3 is a view similar to Fig. 2 showing another angular position of said control members.

Fig. 4 is a view similar to Fig. 2 showing still another angular position of said control members.

Fig. 5 is an end view in section on line 5—5 of Fig. 4.

Fig. 6 is a view similar to Figs. 2–4 showing one angular position of two control members wherein the throttle member controls the gear shift member.

Fig. 7 is a view similar to Fig. 6 showing the control members of Fig. 6 in another angular position.

Fig. 8 is a view similar to Fig. 6 showing a pair of control members each having means for controlling the movement of the other.

Fig. 9 is a view similar to Fig. 6 of a modification.

Fig. 10 is an end view in section on line 10—10 of Fig. 8 and

Fig. 11 is an end view in section on line 11—11 of Fig. 9.

In Fig. 1 a typical power unit is shown in the form of an outboard motor 20 of well known type, motor 20 having driving mechanism 21, also of well known type, shiftable to reverse, neutral or forward positions by a gear shift element 22. A motor speed control mechanism 23 which may include a spark adjustment, is also provided, the motor speed mechanism being operated by a throttle element 24 movable through a low speed and high speed range. The particular power unit illustrated has no mechanism for preventing gear shifting at high speed or for preventing high speed in the reverse and neutral shift positions.

In accordance with this invention, an engine control device 26 may be attached to the motor, or mounted at any suitable distance therefrom to automatically control the shifting of gears and the speed of the engine relative to each other. Control device 26 includes support means 27 which preferably comprises a narrow, elongated hollow housing 28. An elongated opening, or slot, 29 is provided in a wall such as the upper wall of housing 28 to accommodate a gear shift control member 31 and a throttle control member 32. Members 31 and 32 are preferably elongated levers and the throttle control member 32 is shown longer than the other member for clarity although they may obviously be of other lengths as desired.

Housing 28 may be attached to the motor or boat by screws and may be longitudinally split into two identical halves with suitable connecting screws 19 and suitable bosses 18 if desired.

Throttle control member, or lever, 32 includes an integral, laterally extending pivot pin 33 pivotably mounted in a pivot pin recess 34 in a side wall such as 35 of housing 28. Member 32 also includes a projecting stop lug 37 extending laterally in the opposite direction from pivot pin 33 toward the gear shift control member 31. The axes of pin 33 and lug 37 are parallel and the lug 37 is positioned proximate the terminal end 38 of member 32 at a spaced distance from pin 33. A suitable knob 39 is carried at the opposite terminal end 40 of member 32 and lug 37 is caused to oscillate in a fixed plane within housing 28 by longitudinal movement of the knob. A connection 41, preferably in the form of a Bowden wire, is attached at 42 to the terminal end 38 of member 32 and then passes through an opening 43 in back wall 44 of housing 28 whence it extends to the throttle lever 24 to actuate the same.

Gear shift control member, or lever, 31 includes an integral, laterally extending pivot pin 46, pivotably mounted in a pivot pin recess 47 in the opposite side wall 48 of housing 28. Member 31 also includes an arcuate, parti circular, integral, flange 49 extending laterally therefrom toward member 32 and in the path of stop lug 37 when the member 31 is in reverse or neutral positions as shown in Figs. 2 and 3. A connection 50, similar to connection 41 is attached to member 32 at 51, passes through an opening 52 in back wall 44 of housing 28 and is attached to gear shift control element 22 to actuate the same. A suitable knob 53 is carried by member 31 and longitudinal movement thereof causes member 31 to oscillate on pivot 46 in a plane parallel to the plane of oscillation of member 32.

In the embodiment of the device shown in Figs. 2–5, it will be apparent that the throttle control member 32 may be moved freely in its low speed range but cannot enter its high speed range while number 31 is in the reverse or neutral positions, because flange 49 forms a barrier for stop lug 37. However, when member 31 is in the forward position, flange 49 rises out of the way of lug 37 and member 32 may be moved through its entire range. While the structure shown is satisfactory for its purpose, it does not prevent the shifting of gears while the throttle member 32 is in high speed range.

In Figs. 6 and 7 a control device 60 is shown comprising a housing 61 similar to housing 28, a throttle control member 62 oscillatably mounted within the housing at 63 and a gear shift control member 64 oscillatably mounted within the housing at 65. A stop lug 66 extends laterally from member 64 toward the member 62 and at a spaced distance from the pivot point 65. A pair of integral arcuate flanges 68 and 69 are carried by member 62 each on an opposite side of the longitudinal axis thereof and each extending laterally toward member 64 in the path of lug 66. Flange 69 is above flange 68 to form therebetween a parti circular path along which lug 66 may freely travel when throttle control member 62 is in a predetermined position such as shown in Fig. 7. The preferred angular position of member 62, for permitting movement of member 64 is in the low speed range at about normal engine idling speed. As indicated in Fig. 6, at any higher engine speed, such as in the high speed range, the flanges 68 and 69 form a barrier in the path of lug 66 preventing the shifting of gears by member 64.

As shown in Figs. 8 and 10, in the preferred form of the invention, the mechanisms of Figs. 2–5 and 6–7 are combined in a single remote control housing 70. Housing 70 includes an elongated slot 71 in its upper wall, openings 72 and 73 in its rear wall for connections 41 and 50 and pivot pin recesses 74 and 75 in its opposite side walls. Speed change lever 77 includes a pivot pin 78 in recess 75, a speed lug 79 and shift lug control means in the form of the pair of flanges 80 and 81. Power shift lever 83 includes a pivot pin 84 in recess 74, a shift lug 85 and speed lug control means in the form of the flange 86. As in the preceding embodiments the axes of the lugs and pivot pins are all parallel and the path of the levers, lugs and flanges are all in parallel planes. Housing 70 may thus be elongated and narrow to occupy little space. From the foregoing description it will be obvious that the flanges 80 and 81 bar the path of shift lug 85 except when the speed change lever 77 is in its low speed range, thus preventing the stripping of the gear teeth in the outboard motor drive mechanism 21. Similarly it will be obvious that the flange 86 bars the path of speed lug 79 when shift lever 83 is in neutral or reverse position, thereby preventing overheating of the motor, excessive backward speed of the boat and excessive strain on the outboard motor mounting in reverse travel. Flange 86 rises out of the path of speed lug 79 when shift lever 83 is in forward speed, as illustrated in Fig. 8, permitting a complete range of speeds.

A modification is shown in Figs. 9 and 11 wherein a combined speed and shift control is provided as in the device of Figs. 8 and 10. A narrow elongated remote control housing 90, having an elongated slot 91, openings 92 and 93 for connections 41 and 51, pivot pin recesses 94 and 95, speed change lever 97, pivot pin 98, speed lug 99, power shift lever 103, pivot pin 104 and shift lug 105, all correspond to similar parts in the device of Figs. 8 and 10. In place of the pair of integral flanges 80 and 81, however, the shift lug control means comprises a pawl or flat detent 107 pivoted at 108 to housing 90 and provided with three spaced slots 109, 110 and 111 as well as a shaped cam surface 112. A laterally extending cam lug 114 is carried by the speed change lever 97 for engaging surface 112 to raise detent 107 when the lever 97 is in its high speed range thus causing one of the slots such as 111 to prevent lug 105 from moving. When lever 97 is in its low speed range the detent 107 falls away from lug 105 permitting movement of the gear shift member 103. In place of the integral flange 86 the speed lug control means comprises a pawl or flat detent 117 pivoted at 118 to housing 90 and provided with a leg 119 having a shaped cam surface 120 and another leg 121 having a speed lug engaging surface 122. A laterally projecting cam lug 123 is carried by shift lever 103 and arranged to engage cam surface 120 to raise detent 117 when the shift lever 103 is in forward position. The lug engaging surface 122 of leg 121 is thus raised out of the path of speed lug 99 permitting free oscillation of the speed change lever 97 when the shift lever 103 is in forward position. When the shift lever 103 is moved to neutral or reverse position, however, detent 117 falls downwardly to place surface 122 in the path of speed lug 99 thus preventing high speed range movement of lever 97.

It should be noted that all of the parts of the device of Figs. 9 and 11 are oscillatable in planes parallel to each other in the same manner as the parts of the other embodiments. In each case the parts are simple in construction, arranged to oscillate in close parallel planes and easily housed in a thin, flat remote control housing.

It should also be noted that the detent 117 can be eliminated if desired, with the device of Figs. 9 and 11 still retaining all of its functions by modifying the design of detent 107. Thus if slots 109 and 110 are made more shallow and just deep enough to catch the lug or boss 105, then lug 114 cannot pass the low point of surface 112. At the same time, slot 111 can be made deeper, whereby, when the shift lever is in forward speed, detent 107 will rise high enough to permit the speed lever to be moved all the way forward.

I claim:

1. An outboard motor control device for use with an outboard motor having driving mechanism, shiftable to forward, neutral and reverse positions and motor speed control mechanism changeable through a range of high to low speed positions said device comprising a hollow, narrow, elongated housing adapted to be attached to a boat at a point removed from said motor; a drive shift member oscillatable in a longitudinal plane on a lateral pivot within said housing; a speed change member oscillatable in a longitudinal plane on a lateral pivot within said housing; connecting means for connecting said drive shift member to the driving mechanism and said speed change member to the speed control mechanism of an outboard motor and control means comprising integral, laterally extending, co-acting elements, interconnecting said drive shift member and said speed change member, within said housing, for locking said speed change lever in a range of low speed positions except when said drive shift member is in forward position and for locking said drive shift member in forward, neutral or reverse position except when said speed change member is in a predetermined low speed position.

2. A remote control device for shiftable outboard motors said device comprising a hollow housing adapted to be fixed on a support, a gear shift lever pivotally mounted within said housing and having a reverse, neutral and forward angular position around said pivot; a throttle lever pivotally mounted within said housing and having a low speed range and a high speed range of positions angularly around said pivot, both of said levers extending out through an opening in said housing for manual manipulation and being adapted for connection to the corresponding mechanism of an outboard motor, and lug and lug control means interconnecting said levers within said housing for barring said shift lever from movement when the throttle lever is in high range positions and barring said throttle lever from its high range positions when said gear shift lever is in its neutral and reverse positions.

3. An engine control device comprising support means adapted to be fixed in position relative to an engine; a manually manipulable gear shift control member pivotably mounted on said support means to oscillate in a fixed plane; a manually manipulable throttle control member pivotably mounted on said support means to oscillate in a fixed plane parallel to and alongside the plane of said gear shift control member, the pivot axes of said members being parallel to, but spaced from, each other relative to said support means; a pair of lugs, each fixed to one of said members and extending parallel to the pivot axes thereof toward the other member to oscillate in spaced apart paths in a plane parallel to the planes of oscillation of said members and a pair of cam elements, each fixed to one of said members and extending laterally therefrom into the path of the lug on the other member and adapted to control the movement of said lugs in accordance with the angular positions of said members relative to each other.

4. A combination as specified in claim 3 wherein the cam element on said throttle control member comprises a pair of arcuate flanges adapted to bar the path of the lug on said gear shift control member except when said throttle control member is in a predetermined position of its arc of oscillation.

5. An engine control device comprising a hollow elongated housing having an elongated slot in a wall thereof and adapted to be mounted at a point remote from said engine; a manually manipulable gear shift control lever mounted to oscillate in a longitudinal plane on a lateral pivot within said housing, said shift lever having a handle portion extending outwardly through the slot in said housing; a manually manipulable throttle control lever mounted to oscillate in a longitudinal plane on a lateral pivot within said housing, said throttle lever having a handle portion extending outwardly through the slot in said housing, the lateral pivot of said shift lever being below and spaced from, the lateral pivot of said throttle control lever; a lug fixed to said throttle control lever, at a point proximate, but spaced from the lateral pivot thereof, said lug extending laterally in the direction of said gear shift control lever and a lug control cam element fixed to said gear shift control lever, said cam element having a particircular, laterally extending flange normally in the path of oscillation of said lug but adapted to rise out of the path of said lug near a terminal portion of the oscillatory path of said gear shift control lever.

6. A combination as specified in claim 5 plus a second lug fixed to said gear shift control lever at a point spaced from the lateral pivot thereof, said lug extending laterally in the direction of said throttle control lever and second lug control means, within said housing and actuatable by said throttle control lever for barring the movement of said second lug except when said throttle control lever is in a predetermined position.

7. A combination as specified in claim 6 wherein said second lug control means comprises a pair of laterally extending arcuate flanges, each on an opposite side of the central axis of said throttle control lever and fixed thereto proximate the lateral pivot thereof, said arcuate flanges being normally in the path of said second lug but having an opening therethrough at one angular position thereof around said pivot.

8. A remote control device for shiftable outboard motors said device comprising support means adapted to be fixed on a boat, a manually manipulable gear shift lever pivotally mounted on said support means and movable angularly from a reverse position, through a neutral position to a forward position in an arc; a manually manipulable throttle lever pivotally mounted on said support means and movable angularly from a low speed range position to a high speed range position in an arc alongside said first mentioned arc; a pair of laterally extending lugs, each carried by one of said levers and extending toward the other lever and a pair of lug control cam elements, each carried by one of said levers and extending into the path of the lug on the other lever, the cam element on said gear shift lever forming a barrier to the lug on said throttle lever except when said gear shift lever is in forward position and the cam element on said throttle lever forming a barrier to the lug on said gear shift lever except when said throttle lever is in a low speed range position.

References Cited in the file of this patent
UNITED STATES PATENTS

| | | |
|---|---|---|
| 2,443,084 | Rhodes | June 8, 1948 |
| 2,647,415 | Dean et al. | Aug. 4, 1953 |
| 2,716,474 | Panish | Aug. 30, 1955 |